United States Patent
Zhang et al.

(10) Patent No.: US 7,129,605 B2
(45) Date of Patent: *Oct. 31, 2006

(54) GENERATOR ROTOR LEAD PATH FOR CONNECTING TO A FIELD WINDING

(75) Inventors: Jiping Zhang, Winter Springs, FL (US); Robert R. Messel, Winter Springs, FL (US); Randy E. Whitener, Oviedo, FL (US); Peter J. Clayton, Casselberry, FL (US); Larry Zeller, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 338 days.

This patent is subject to a terminal disclaimer.

(21) Appl. No.: 10/748,035

(22) Filed: Dec. 30, 2003

(65) Prior Publication Data

US 2004/0217662 A1  Nov. 4, 2004

Related U.S. Application Data

(60) Provisional application No. 60/437,702, filed on Jan. 2, 2003.

(51) Int. Cl.
*H02K 3/46* (2006.01)

(52) U.S. Cl. .......................... 310/71; 310/270
(58) Field of Classification Search ................ 310/71, 310/270, 260; 439/856, 857
See application file for complete search history.

(56) References Cited

U.S. PATENT DOCUMENTS

| | | | |
|---|---|---|---|
| 1,588,556 A | 6/1926 | Thompson | |
| 3,422,213 A | 1/1969 | Webb | |
| 4,204,085 A | 5/1980 | Chapman et al. | |
| 4,368,399 A | 1/1983 | Ying et al. | |
| 4,442,182 A | 4/1984 | Chart | |
| 4,870,308 A * | 9/1989 | Sismour, Jr. ................. | 310/71 |
| 4,955,239 A | 9/1990 | Cage et al. | |
| 5,039,896 A | 8/1991 | Adams et al. | |
| 5,065,059 A | 11/1991 | Adams et al. | |
| 5,122,696 A | 6/1992 | Shih et al. | |
| 5,184,792 A * | 2/1993 | Bernhard et al. ............. | 248/71 |
| 5,358,432 A | 10/1994 | Shih et al. | |
| 6,236,128 B1 | 5/2001 | Dragash, Jr. | |
| 6,280,265 B1 | 8/2001 | Hopeck et al. | |
| 6,424,063 B1 | 7/2002 | Whitener et al. | |
| 6,501,201 B1 | 12/2002 | Whitener et al. | |
| 6,541,888 B1 * | 4/2003 | van Heyden et al. ........ | 310/214 |
| 6,798,101 B1 * | 9/2004 | Tekawade ..................... | 310/71 |
| 2003/0057801 A1 | 3/2003 | Zeller et al. | |

(Continued)

*Primary Examiner*—Tran Nguyen

(57) ABSTRACT

An interconnecting assembly for a rotor assembly of a dynamoelectric machine is provided. The interconnecting assembly may be part of a conductive path generally extending from a radially inward section of the rotor assembly to a winding located at a radially outward section of the rotor assembly. The interconnecting assembly may be made up of a flexible member (44) comprising a bend (50). The interconnecting assembly may be further made up of a connector (70) connected to the flexible member to pass axial and radial forces that develop during operation of the machine. The positioning of the connector relative to the flexible member may be arranged so that an effect of an axial force on a radius of curvature of the bend and an effect of a radial force on that radius of curvature are opposed to one another. This leads to lower peaks of mechanical stress at the flexible member (44) (e.g., J-strap), which in turn leads to a relatively more durable and reliable conductive path for the rotor assembly of the dynamoelectric machine.

20 Claims, 4 Drawing Sheets

U.S. PATENT DOCUMENTS

2004/0189118 A1* 9/2004 Zhang et al. .................. 310/71

2005/0200214 A1* 9/2005 Zhang et al. .................. 310/71

* cited by examiner

GENERATOR ROTOR LEAD PATH FOR CONNECTING TO A FIELD WINDING

This application claims priority from a provisional application filed on Jan. 2, 2003, having application Ser. No. 60/437,702, which is incorporated herein by reference.

FIELD OF THE INVENTION

The present invention relates in general to a lead path configuration for an electric device and, more particularly, to an improved lead path configuration for a generator rotor used in a power generation plant.

BACKGROUND OF THE INVENTION

Many power generation plants produce electricity by converting various forms of energy (e.g. fossil fuel, nuclear fuel, hydro or wind flow, and geothermal heat) into mechanical energy (e.g. rotation of a turbine shaft), and then converting the mechanical energy into electrical energy (e.g. by the principles of electromagnetic induction). Some of these power generation plants, such as a fossil-fuel power generation plant, may comprise a turbine, a generator and an exciter. The turbine, generator and exciter are typically coupled to each other in axial alignment, with the generator located between the turbine and the exciter.

The turbine converts fossil fuel energy into mechanical energy in the form of turbine shaft rotation through a steam or combustion cycle. The generator then converts the rotational energy into electrical energy. The generator includes an axially extending rotor journaled in an annular stator that surrounds the rotor. The rotor has a shaft in which conductive coil windings may be axially arranged. The stator has punchings that collectively form an annular core in which conductive coil windings are positioned generally parallel with respect to the axial rotor coils. As the turbine shaft rotates the generator rotor, the exciter provides an electrical current to the rotor coil windings. The rotating electrically excited rotor creates a magnetic flux that induces an electrical current in the stationary stator coil windings. This induced electrical current constitutes the electricity that the power generation plant supplies to consumers of electricity.

One aspect of the foregoing power generation operation involves the electrical interconnection of the exciter and generator. An electrically conductive lead path is used to carry current in a closed loop configuration from the exciter, through the generator rotor coil windings, and then back to the exciter.

It is known that repeated start/stop cycling for generators of large size and weight creates substantial inertial and thermal forces that induce mechanical stresses on the various components of such generators. Components situated at some radial distance from the rotor axis may be subjected to significant centrifugal forces. Such components may include field coils disposed about the rotor and restrained from moving outwardly relative to the rotor axis by restraining structures, such as adhesives, coil wedges, retaining rings and other restraining devices.

Electrically connecting structures that connect the field coils to terminals for establishing an electrically conductive lead path to the exciter are traditionally referred to in the art as J-straps. These connecting structures may be subjected to the above-described forces, including forces tending to axially and/or radially displace the field coils relative to the rotor each time the generator is started or stopped. Lead path failure can cause electric arcing or re-routing of the electric current through nearby conductive materials. Arcing and re-routing can melt portions of the rotor shaft and otherwise damage the generator. Accordingly, robust connecting structures are desired.

BRIEF DESCRIPTION OF THE DRAWINGS

The advantages of the invention will be more apparent from the following description in view of the following drawings:

FIG. 1 illustrates a known lead path that uses a solid plate for electromechanically interconnecting generator components therein.

DETAILED DESCRIPTION OF THE INVENTION

Figure 1:
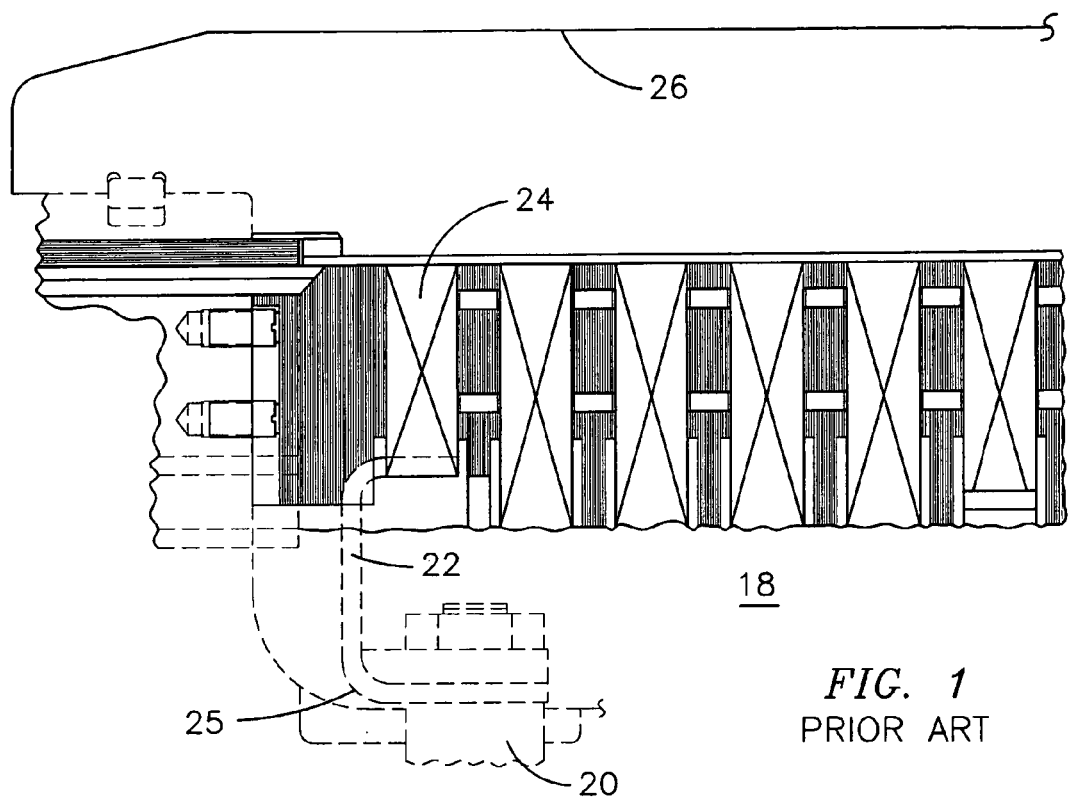
FIG. 1 is a sectional view of an exemplary rotor, as may be used in an electric power generator. More specifically.

FIG. 1 shows part of an exemplary rotor 18, as may be used in an electric power generator. To better appreciate some of the issues solved by the present invention, FIG. 1 illustrates a known lead conductive path comprising a radial lead 20 attached to a solid metallic plate 22. The radial lead 20 carries an excitation current from an exciter (not shown) and the solid metallic plate 22 physically and electrically connects with a coil winding 24.

It has been found that various physical phenomena may cause or tend to cause the conductive path of FIG. 1 to sever or otherwise fail, such as at or near a curved portion 25, e.g., a bottom curved portion. One phenomenon may involve radial forces exerted on the solid plate 22. For example, the radial forces may be caused by radial expansion of a retaining ring 26 during generator start up and operation. Since the radially expanded retaining ring supports at least the winding connected to the solid plate 22, the solid plate also radially expands. This radial expansion may cause various and varying stresses and loads at the solid plate 22.

Another phenomenon may involve axial movement or pivoting of the solid plate 22, which may be caused by thermal expansion of the coil windings during generator start up and/or operation. Since the coil windings commonly have a higher thermal expansion rate than the rotor shaft and are heated by the electric current, coil windings 24 may axially expand relatively faster and to a larger extent than the rotor shaft. This thermal expansion may cause an axial force on the solid plate 22, which is positioned between the coil windings 24 and the rotor shaft and must pivot about the curved bottom portion 25 to allow for the thermally-induced expansion. The foregoing axial expansion, similar to the radial expansion, may cause various and varying stresses, stress concentrations, and loads at the solid plate 22. Moreover, the combined effects of the axial and radial expansions and resulting stresses, stress concentrations and loads may be additive and further compromise conductive path integrity.

Aspects of the present invention provide an improved lead conductive path configured to reduce stresses that might develop, for example, at or near the bottom curved bottom portion 25 of solid plate 22. Other aspects of the present invention also provide for such an improved conductive path to be connectable to a bottom of a stacked winding. In yet other aspects of the present invention, a kit is provided for repairing or retrofitting a field-deployed lead conductive path with an improved conductive path embodying aspects of the present invention.

Figure 2:
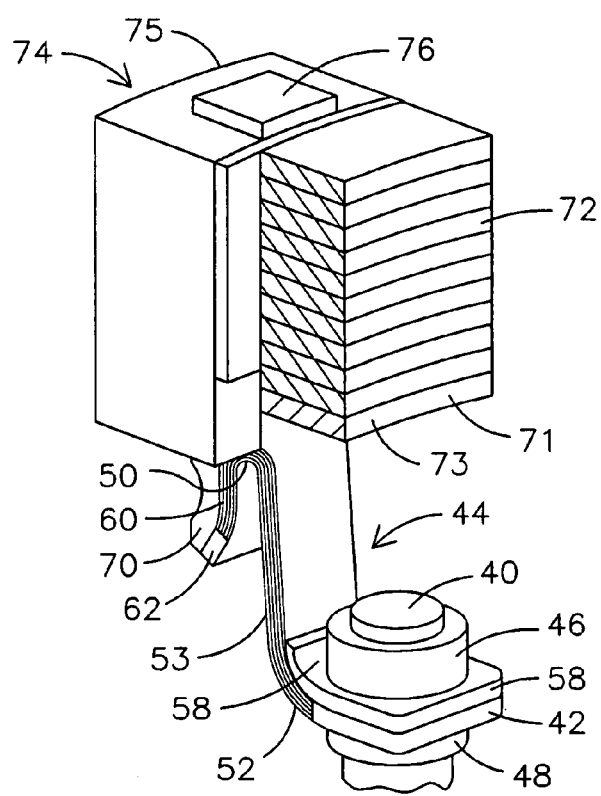
FIG. 2 is a perspective view of an exemplary embodiment of a lead path embodying aspects of the present invention.

FIG. 2 shows a perspective view of an exemplary embodiment of a lead conductive path embodying aspects of the present invention. The lead conductive path may comprise a radial lead 40 electromechanically connected to a first leg 42 of a flexible member 44 through a lead nut 46 affixing the first leg 42 against a support 48. Flexible member 44, e.g., a J-strap, in accordance with aspects of the present invention may be made up of a plurality of electrically conductive leaves, e.g., six or more copper leaves, in lieu of a solid plate. The number and/or thickness of the leaves may vary depending on the electromechanical requirements of any given application. For example, the collective cross-sectional of the leaves should be sufficiently large to appropriately carry the exciter current. Another design consideration for selecting the number and/or thickness of the leaves may be the magnitude of the mechanical stresses handled by the flexible member 44. The term "strap" or "J-strap" is not intended to limit flexible member 44 to a J-shaped looped flexible structure, rather, the term "strap" or "J-strap" is used consistent with traditional terminology, as will be understood by those skilled in the art.

Figure 5:
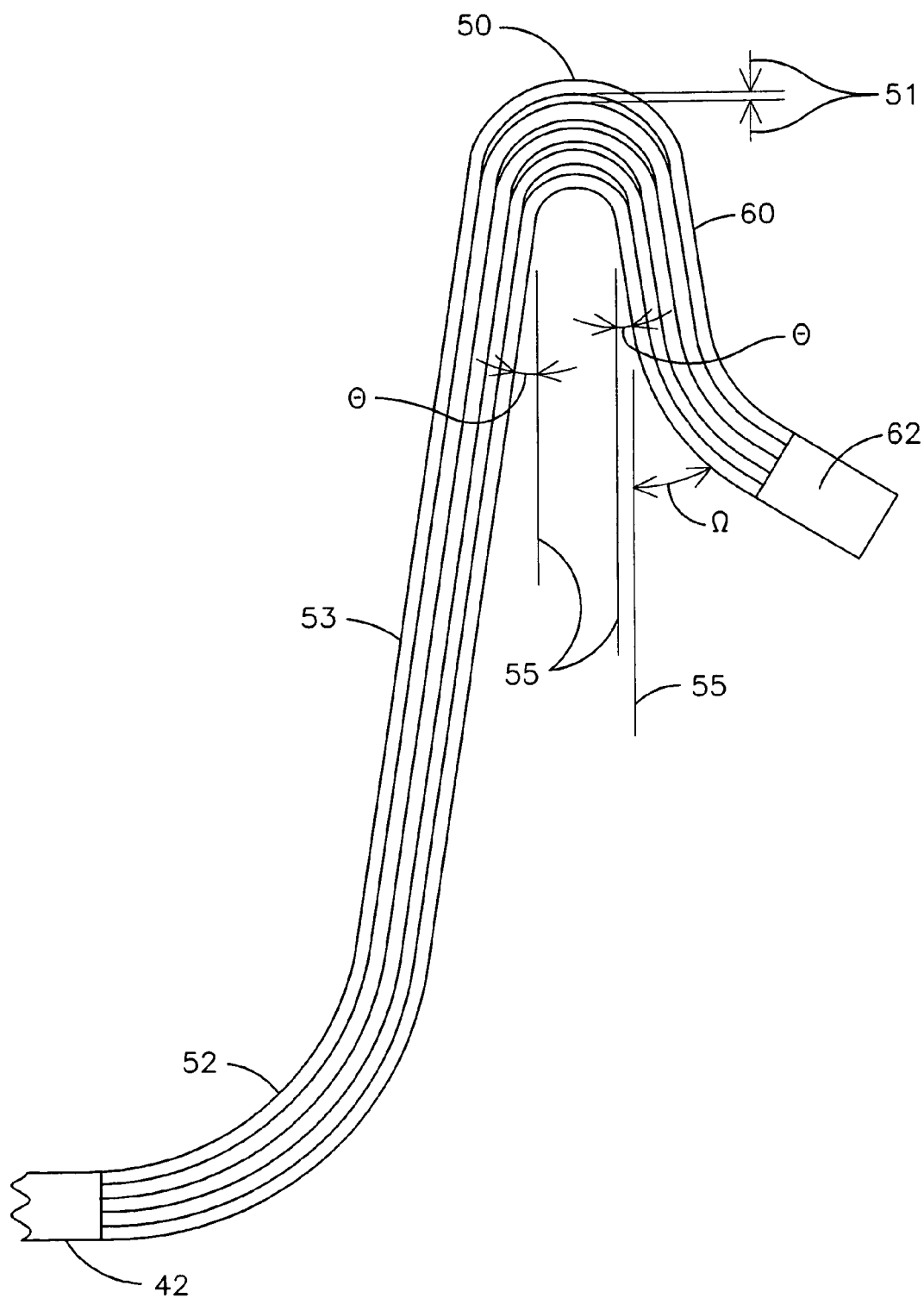
FIG. 5 is a sectional view of a flexible member (J-strap) comprising a plurality of leaves, which strap is part of a lead path embodying aspects of the present invention.

Flexible member 44 may be configured to provide an outboard bend 50 (e.g., a bend enabling a U-turn and defining a mouth or opening facing radially inwards) remote from an inboard curved region 52 of flexible member 44. The terms "inboard" and "outboard" may be used to describe relative location, with the term "inboard" describing a location that is closer to the axial center of the generator rotor length than a location that is "outboard." Inboard curved region 52 may be situated between the first leg 42 and a second leg 53 of flexible member 44. In one exemplary embodiment, as may be better appreciated in FIG. 5, the second leg 53 may extend at a respective angle Θ (e.g., in a range from about 2 degrees to about 5 degrees) relative to a radial direction, represented by a vertical line 55. The outboard bend 50 may preferably comprise leaves having a suitable spacing or gap, (e.g., represented by spacing 51) between one another (in one exemplary embodiment such spacing may range from about 0.10 in. to about 0.30 in.). This inter-leaf spacing avoids friction between adjacent leaves at the outboard bend and avoids incremental stress that would otherwise result from inter-leaf friction.

FIG. 2 further shows a support plate 58 for supporting curved region 52 of flexible member 44. It will be appreciated that support plate 58 provides a restraint to the curved region 52 of flexible member 44 in the presence of outward radial loads as may develop as the rotor is brought to a rotating operational speed (e.g., 3600 RPM). In one exemplary embodiment, support plate 58 may comprise high strength structural materials, such as steel or copper alloy, to meet the designed cyclic life requirement.

Figure 3:
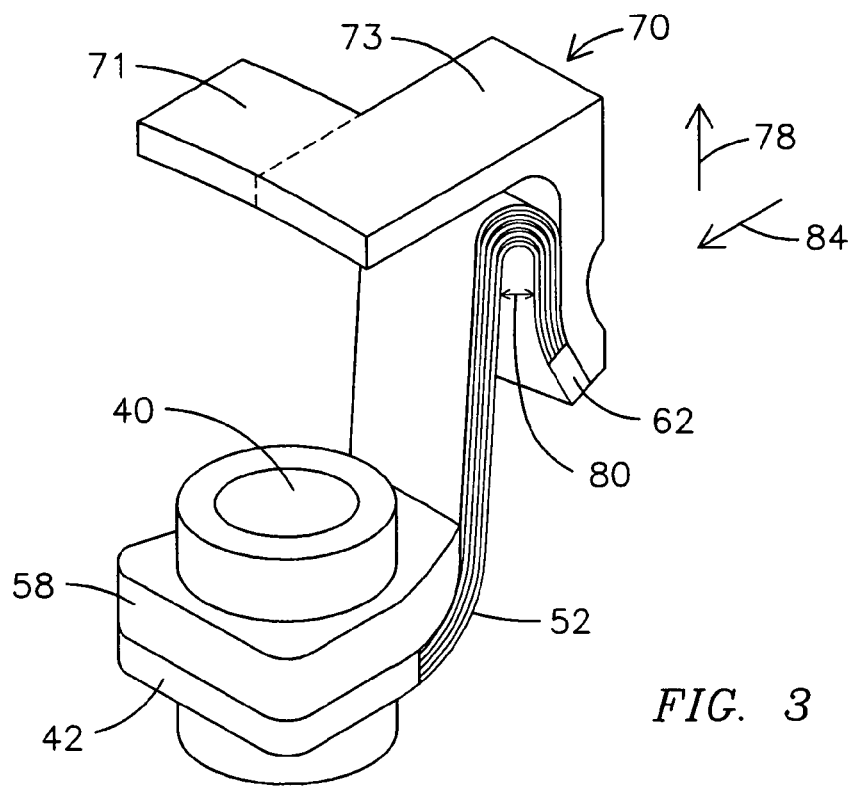
FIGS. 3 and 4 are perspective views of respective exemplary embodiments of the lead path of FIG. 2, as may be configured for connecting to a bottom turn of a stacked winding.
Figure 4:
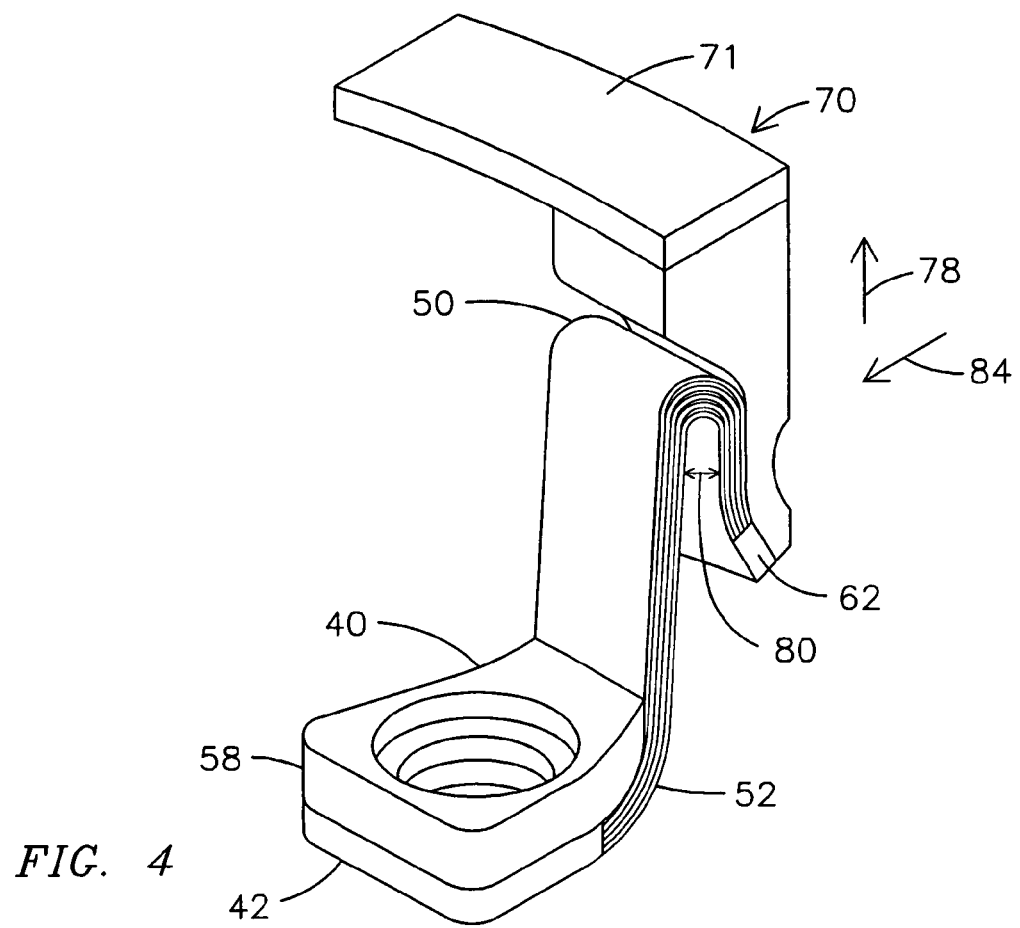

A third leg 60 of flexible member 44 (that may also extend at angle Θ relative to the radial direction) includes an appendage 62 (e.g., comprising a connector interface section) that may extend at an angle Ω (e.g., in the order of approximately 30 degrees) relative to the radial direction. That is, a different angle with respect to the radial direction than the remainder of the third leg. In one exemplary embodiment specifically configured for providing a bottom-turn winding connection, the connector-interface section may be electromechanically connected (e.g., through brazing) to a connector 70, in turn electromechanically connected to a bottom turn 71 of a field winding 72 (e.g., a stacked winding) through an interface plate 73. FIGS. 3 and 4 illustrate possible exemplary configurations of the connector 70. Brazing or any other technique suitable for joining two metallic bodies may provide the connection between the bottom turn of the field winding and the interface plate.

Portions of the electrical lead path may be electrically shielded and/or restrained within allowable axial and radial tolerances by an assembly 74 (FIG. 2) comprising a pole block 75 (e.g., a pole face support block arranged to provide support relative to a pole face of the rotor) and a radial support block 76.

Figure 6:
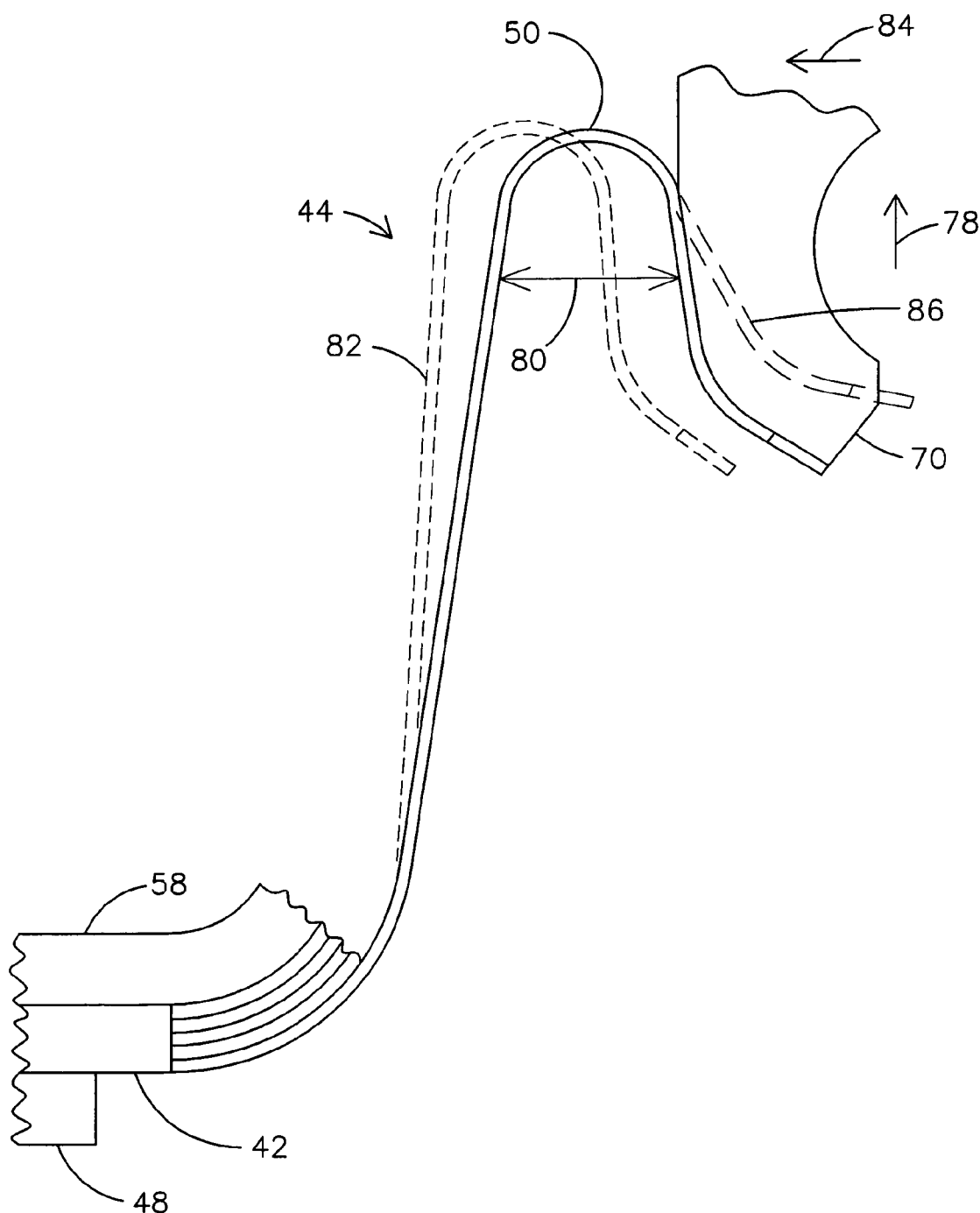
FIG. 6 is a side elevational view of one exemplary leaf of the flexible member of FIG. 5, including exemplary representations of mechanical effects that tend to counteract one another when the flexible member is subjected to a radial load and an axial load.

As may be appreciated from the view shown in FIG. 6, when the connector 70 (and in turn the J-strap) are subjected to a radial load, such as due to centrifugal force, graphically represented by arrow 78, a gap 80 defined by bend 50 tends to open up (e.g., increased radius of curvature), as represented by dashed line 86. Conversely, when connector 70 (and in turn the J-strap) are subjected to an axial load, such as due to thermal expansion during heat-up, graphically represented by arrow 84, the gap 80 defined by bend 50 tends to close up (e.g., decreased radius of curvature), as represented by dashed line 82. Thus, it will be appreciated that the positioning of connector 70 relative to the J-strap is such that the respective mechanical effects (e.g., effect on the radius of curvature of the bend 50) of an axial force and a radial force acting on the J-strap tend to offset or cancel one another. This is particularly advantageous since, as elaborated in greater detail below, this leads to lower peaks of mechanical stress at the J-strap, which in turn leads to a relatively more durable and reliable lead path for the generator rotor.

Analytical Results

An analytical study was conducted on the structural impact of a traditional "open strap" design vs. a "close strap" design. That is, a design embodying aspects of the present invention.

"Open strap" design—the axial displacement (e.g., due to thermal expansion) tends to open the gap in the J-strap and radial displacement also tends to open the gap.

"Close strap" design—the axial displacement (e.g., due to thermal expansion) tends to close the gap in the J-strap while radial displacement tends to open the gap.

To simplify the analysis, just a symmetric half of one strap was taken from a model. The displacements were fixed to one end of the strap and applied to the other end of the strap. Rotational speed was added to the analysis and the elastic-plastic FEA (Finite Element Analysis) was conducted using non-linear S-e properties. Representative displacement boundary conditions were used for this comparative study.

The first load case studied is a FEA model for a strap with equal leg length on both sides. A radial displacement of 0.047" and an axial displacement of 0.126" were applied to the FEA model. For "Open Strap", the maximum principal stress, S1, is 20,877 psi and Von Mises stress, Seqv, is 17,341 psi. For "Close Strap", the maximum principal stress, S1, is 14,254 psi and Von Mises stress, Seqv, is 13,774 psi.

The second load case evaluates the impact of axial displacement only. For "Open Strap", the maximum principal stress, S1, is 16,040 psi and Von Mises stress, Seqv, is 13,482 psi. For "Close Strap", the maximum principal stress, S1, is 10,107 psi and Von Mises stress, Seqv, is 9,703 psi.

The third load case took the inner strap from the FEA model and applied both axial and radial displacements on it. The "Open Strap" design had the maximum principal stress, S1, of 25,473 psi and Von Mises stress, Seqv, of 20,890 psi. The "Close Strap" design had the maximum principal stress, S1, of 9,620 psi and Von Mises stress, Seqv, of 9,449 psi.

This study showed that the "Close Strap" design had lower stress values than that of the "Open Strap" design. Typically, the "Open Strap" design has the maximum stress at the inner surface of the strap while the "Close Strap" design has the maximum stress at the outer surface of the strap. A summary of the stress comparison is given in Table 1.

TABLE 1

COMPARATIVE STUDY OF OPEN GAP AND CLOSE GAP FOR A SINGLE STRAP - THICKNESS OF 0.032"

| | MAXIMUM PRINCIPAL STRESS | VON MISES STRESS |
|---|---|---|
| LOAD CASE #1 EQUAL HEIGHT STRAP SUBJECTED TO BOTH RADIAL AND AXIAL DISPLACEMENTS | | |
| Open Gap | 20,877 PSI | 17,341 PSI |
| Close Gap | 14,254 PSI | 13,774 PSI |
| LOAD CASE #2 EQUAL HEIGHT STRAP SUBJECTED TO ONLY AXIAL DISPLACEMENTS | | |
| Open Gap | 16,040 PSI | 13,482 PSI |
| Close Gap | 10,107 PSI | 9,703 PSI |
| LOAD CASE #3 STRAP WITH UNEQUAL HEIGHT SUBJECTED TO BOTH RADIAL AND AXIAL DISPLACEMENTS | | |
| Open Gap | 25,473 PSI | 20,890 PSI |
| Close Gap | 9,620 PSI | 9,449 PSI |

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. An interconnecting assembly for a rotor assembly of a dynamoelectric machine, said interconnecting assembly being part of a conductive path generally extending from a radially inward section of the rotor assembly to a winding located at a radially outward section of the rotor assembly the interconnecting assembly comprising:
   a flexible member comprising a bend, wherein said flexible member comprises a first leg connected to a radial lead and extending along an axial direction; and
   a connector connected to the flexible member to pass axial and radial forces that develop during operation of the machine, the positioning of the connector relative to the flexible member being arranged so that an effect of an axial force on a radius of curvature of the bend and an effect of a radial force on said radius of curvature are opposed to one another.

2. The interconnecting assembly of claim 1 wherein said axial force tends to close the bend, and said radial force tends to open the bend.

3. The interconnecting assembly of claim 1 wherein said bend defines a mouth facing radially inwards.

4. The interconnecting assembly of claim 1 wherein said flexible member comprises a plurality of conductive leaves.

5. The interconnecting assembly of claim 4 further comprising a gap between adjacent leaves in said bend.

6. The interconnecting assembly of claim 1 wherein said flexible member further comprises a second leg connected to the first leg through a curved section.

7. The interconnecting assembly of claim 6 wherein said second leg extends at an angle ranging from about two to about five degrees relative to a radial direction.

8. The interconnecting assembly of claim 6 wherein said flexible member further comprises a third leg connected to the second leg through said bend.

9. The interconnecting assembly of claim 8 wherein said third leg extends at an angle ranging from about two to about five degrees relative to the radial direction.

10. The interconnecting assembly of claim 8 wherein said third leg includes an appendage comprising a connector interface section, said appendage extending at a different angle with respect to the radial direction than a remainder of the third leg.

11. A dynamoelectric machine comprising a winding located at a radially outward section of a rotor assembly said machine comprising:
   a conductive path generally extending from a radially inward section of the rotor assembly to said winding, said conductive path comprising a flexible member comprising a bend and connected between said radially inward section of the rotor assembly and the winding, wherein said flexible member comprises a first leg connected to a radial lead and extending along an axial direction, said flexible member oriented so that said bend exhibits a first effect in response to an axial force and a second effect in response to a radial force during operation of said machine, said first and second effects being opposed to one another.

12. The dynamoelectric machine of claim 11 wherein said axial force tends to close the bend, and said radial force tends to open the bend.

13. The dynamoelectric machine of claim 11 wherein said bend defines a mouth facing radially inwards.

14. The dynamoelectric machine of claim 11 wherein said flexible member comprises a plurality of conductive leaves.

15. The dynamoelectric machine of claim 14 further comprising a gap between adjacent leaves in said bend.

16. The dynamoelectric machine of claim 11 wherein said flexible member further comprises a second leg connected to the first leg through a curved section.

17. The dynamoelectric machine of claim 16 wherein said second leg extends at an angle ranging from about two to about five degrees relative to a radial direction.

18. The dynamoelectric machine of claim 16 wherein said flexible member further comprises a third leg connected to the second leg through said bend.

19. The dynamoelectric machine of claim 18 wherein said third leg extends at an angle ranging from about two to about five degrees relative to the radial direction.

20. The dynamoelectric machine of claim 18 wherein said third leg includes an appendage comprising a connector interface section, said appendage extending at a different angle with respect to the radial direction than a remainder of the third leg.

* * * * *